US009999032B2

United States Patent
Gauvreau et al.

(10) Patent No.: US 9,999,032 B2
(45) Date of Patent: Jun. 12, 2018

(54) METHOD AND APPARATUS FOR SELECTING AND RESELECTING AN UPLINK PRIMARY CARRIER

(71) Applicant: InterDigital Patent Holdings, Inc., Wilmington, DE (US)

(72) Inventors: Jean-Louis Gauvreau, La Prairie (CA); Stephen E. Terry, Northport, NY (US); Paul Marinier, Brossard (CA); Kyle Jung-Lin Pan, Saint James, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 174 days.

(21) Appl. No.: 14/449,944

(22) Filed: Aug. 1, 2014

(65) Prior Publication Data

US 2015/0023285 A1      Jan. 22, 2015

Related U.S. Application Data

(63) Continuation of application No. 12/721,815, filed on Mar. 11, 2010, now abandoned.

(Continued)

(51) Int. Cl.
*H04W 72/04* (2009.01)
*H04L 1/18* (2006.01)
(Continued)

(52) U.S. Cl.
CPC ....... *H04W 72/0413* (2013.01); *H04L 1/1861* (2013.01); *H04W 72/02* (2013.01);
(Continued)

(58) Field of Classification Search
CPC .. H04W 72/02; H04W 72/1284; H04L 1/1861
See application file for complete search history.

(56) References Cited

U.S. PATENT DOCUMENTS 7,376,879 B2    5/2008    Terry et al.
7,778,151 B2    8/2010    Bertrand et al.
(Continued)

FOREIGN PATENT DOCUMENTS

CN    101442818    5/2009
CN    101588224    11/2009
(Continued)

OTHER PUBLICATIONS

"Uplink Control Signaling with Persistent Scheduling", 3GPP TSG RAN WG1 Meeting #52, R1-0807349, 3 pages, Sorrento, Italy, Feb. 11-15, 2008.*

(Continued)

*Primary Examiner* — Alpus Hsu
(74) *Attorney, Agent, or Firm* — Quasim Shah

(57) ABSTRACT

A method and apparatus are described for using an uplink (UL) primary carrier for long term evolution-advanced (LTE-A) to support hybrid automatic repeat request (HARQ) feedback, a channel quality indicator (CQI), a scheduling request (SR), power headroom, and at least one buffer status report in the context of asymmetrical deployment and symmetrical deployment. A method, implemented by a wireless transmit/receive unit (WTRU), for multi-carrier operations, includes transmitting control information on a physical uplink shared channel (PUSCH) on a condition that PUSCH transmissions are occurring on at least one of multiple uplink component carriers (UL CCs), and transmitting the control information on a physical uplink control channel (PUCCH) on a condition that the PUSCH transmissions by the WTRU are not occurring on any of the multiple UL CCs.

22 Claims, 9 Drawing Sheets

Related U.S. Application Data

(60) Provisional application No. 61/218,271, filed on Jun. 18, 2009, provisional application No. 61/159,665, filed on Mar. 12, 2009.

(51) Int. Cl.
*H04W 72/02* (2009.01)
*H04W 72/12* (2009.01)
*H04L 5/00* (2006.01)

(52) U.S. Cl.
CPC .......... *H04L 5/001* (2013.01); *H04L 5/0055* (2013.01); *H04W 72/042* (2013.01); *H04W 72/0406* (2013.01); *H04W 72/1284* (2013.01)

(56) References Cited

U.S. PATENT DOCUMENTS

| | | | |
|---|---|---|---|
| 7,912,471 B2 | 3/2011 | Kodikara Patabandi et al. | |
| 7,957,298 B2 | 6/2011 | Yi et al. | |
| 8,014,352 B2 | 9/2011 | Tiirola et al. | |
| 8,094,639 B2* | 1/2012 | Kim | H04L 5/0007 370/335 |
| 8,112,092 B2 | 2/2012 | Yamada et al. | |
| 8,311,026 B2 | 11/2012 | Kishiyama et al. | |
| 8,522,105 B2 | 8/2013 | Papasakellariou et al. | |
| 8,619,615 B2 | 12/2013 | Aiba et al. | |
| 8,644,867 B2* | 2/2014 | Aiba | H04L 1/0025 455/452.1 |
| 8,649,343 B2 | 2/2014 | Ahn et al. | |
| 8,681,728 B2* | 3/2014 | Jung | H04L 1/1893 370/329 |
| 8,797,977 B2* | 8/2014 | Aiba | H04L 1/0026 370/252 |
| 8,811,262 B2* | 8/2014 | Chung | H04B 7/15542 370/315 |
| 9,065,604 B2 | 6/2015 | Aiba et al. | |
| 2003/0109257 A1 | 6/2003 | Nilsson et al. | |
| 2003/0109284 A1 | 6/2003 | Akerberg et al. | |
| 2007/0099615 A1 | 5/2007 | Farnsworth et al. | |
| 2007/0133458 A1* | 6/2007 | Chandra | H04L 1/0025 370/329 |
| 2007/0155390 A1 | 7/2007 | Kodikara Patabandi et al. | |
| 2007/0161377 A1 | 7/2007 | Kodikara Patabandi et al. | |
| 2008/0311919 A1 | 12/2008 | Whinnett et al. | |
| 2009/0046650 A1 | 2/2009 | Dalsgaard et al. | |
| 2009/0129342 A1 | 5/2009 | Hwang et al. | |
| 2010/0015982 A1 | 1/2010 | Wager et al. | |
| 2010/0041428 A1 | 2/2010 | Chen et al. | |
| 2010/0098012 A1 | 4/2010 | Bala et al. | |
| 2010/0113024 A1 | 5/2010 | Wu | |
| 2010/0118817 A1 | 5/2010 | Damnjanovic et al. | |
| 2010/0150086 A1* | 6/2010 | Harada | H04W 56/0005 370/329 |
| 2010/0195575 A1* | 8/2010 | Papasakellariou | H04W 36/385 370/328 |
| 2010/0195629 A1 | 8/2010 | Chen et al. | |
| 2010/0202306 A1 | 8/2010 | Jersenius et al. | |
| 2010/0208679 A1* | 8/2010 | Papasakellariou | H04L 1/1614 370/329 |
| 2010/0271970 A1* | 10/2010 | Pan | H04L 1/0026 370/252 |
| 2010/0272035 A1 | 10/2010 | Park et al. | |
| 2011/0021230 A1 | 1/2011 | Moberg et al. | |
| 2011/0103335 A1 | 5/2011 | Golitschek Edler Von Elbwart et al. | |
| 2011/0158194 A1 | 6/2011 | Musikka et al. | |
| 2011/0235620 A1* | 9/2011 | Ahn | H04W 56/00 370/336 |
| 2011/0237284 A1 | 9/2011 | Frederiksen et al. | |
| 2011/0243087 A1* | 10/2011 | Ahn | H04W 52/146 370/329 |
| 2011/0261776 A1* | 10/2011 | Ahn | H04L 5/0007 370/329 |
| 2011/0268067 A1* | 11/2011 | Seo | H04B 7/0632 370/329 |
| 2011/0274099 A1* | 11/2011 | Kwon | H04L 1/0027 370/338 |
| 2011/0299467 A1* | 12/2011 | Kim | H04L 5/0057 370/328 |
| 2011/0305134 A1 | 12/2011 | Chung et al. | |
| 2011/0311082 A1 | 12/2011 | Kuo et al. | |
| 2011/0312326 A1 | 12/2011 | Kwon et al. | |
| 2012/0002555 A1 | 1/2012 | Ohuchi et al. | |

FOREIGN PATENT DOCUMENTS

| | | |
|---|---|---|
| CN | 101588226 | 11/2009 |
| CN | 101594211 | 12/2009 |
| CN | 101789851 | 7/2010 |
| CN | 101572585 | 1/2013 |
| EP | 2381735 | 10/2011 |
| EP | 2408254 | 1/2012 |
| EP | 2 461 637 | 6/2012 |
| JP | 2005-512426 | 4/2005 |
| JP | 2009-049538 | 3/2009 |
| RU | 2002129901 | 3/2004 |
| RU | 2326497 | 11/2007 |
| TW | 201404223 | 1/2014 |
| WO | WO-2005/039094 | 4/2005 |
| WO | WO-2005/109701 | 11/2005 |
| WO | WO-2009/008337 | 1/2009 |
| WO | 09/120286 | 10/2009 |
| WO | WO-2010/013963 | 2/2010 |
| WO | WO-2010/103895 | 9/2010 |
| WO | WO-2010/104957 | 9/2010 |

OTHER PUBLICATIONS

LG Electronics, "Considerations on DL/UL Transmission in Asymmetric Carrier Aggregation", 3GPP TSG RAN WGI Meeting #55, Nov. 10-14, 2008, R1-084197.*

Catt, "Physical cell ID in Carrier aggregation," 3GPP TSG RAN WG1 #55bis, R1-090192, Slovenia, Ljubljana (Jan. 12-16, 2009).

Huawei, "PUCCH design for carrier aggregation," 3GPP TSG RAN WG1 Meeting #56, R1-090813, Athens, Greece (Feb. 9-13, 2009).

Third Generation Partnership Project, Technical Specification Group Radio Access Network; Evolved Universal Terrestrial Radio Access (E-UTRA); Physical layer procedures (Release 8), 3GPP TS 36.213 V8.2.0 (Mar. 2008).

"3rd Generation Partnership Project; Technical Specification Group Radio Access Network; Evolved Universal Terrestrial Radio Access (E-UTRA); Requirements for support of radio resource management (Release 8)", 3GPP TS 36.133 V8.4.0, Dec. 2008, 126 pages.

"Decision on Grant", Russian Application No. 2011141277, May 31, 2013, 9 pages.

"Decision on Grant (English Translation)", Russian Application No. 2011141277, May 31, 2013, 5 pages.

"Examination Notification", Taiwanese Patent Application No. 099107110, Jan. 22, 2015, 1 page.

"Examination Notification (English Translation)", Taiwanese Patent Application No. 099107110, Jan. 22, 2015, 1 page.

"Notice of Allowance", Korean Patent Application No. 10-2011-7023920, Sep. 11, 2014, 3 pages.

"Notice of Allowance (English Translation)", Korean Patent Application No. 10-2011-7023920, Sep. 11, 2014, 1 page.

"Official Notice of Rejection", Japanese Patent Application No. 2014-000420, Oct. 28, 2014, 7 pages.

"Official Notice of Rejection (English Translation)", Japanese Patent Application No. 2014-000420, Oct. 28, 2014, 9 pages.

Ericsson, "Carrier aggregation in LTE-Advanced," TSG-RAN WG1 #53bis, R1-082468 (Jun. 30-Jul. 4, 2008).

LG Electronics, "Considerations on DL/UL Transmission in Asymmetric Carrier Aggregation," 3GPP TSG RAN WG1 Meeting #55bis, R1-090211 (Jan. 12-16, 2009).

TD Tech, "Use of UL-Index in UL Grant for A/N Multiplexing in PUSCH in TDD," 3GPP TSG RAN WG1 Meeting #53bis, R1-082350 (Jun. 30-Jul. 4, 2008).

(56) References Cited

OTHER PUBLICATIONS

Third Generation Partnership Project, "Technical Specification Group Radio Access Network; Evolved Universal Terrestrial Radio Access (E-UTRA); Multiplexing and channel coding (Release 9)," 3GPP TS 36.212 V9.0.0 (Dec. 2009).
Third Generation Partnership Project, "Technical Specification Group Radio Access Network; Evolved Universal Terrestrial Radio Access (E-UTRA); Multiplexing and channel coding (Release 8)," 3GPP TS 36.212 V8.8.0 (Dec. 2009).
Third Generation Partnership Project, "Technical Specification Group Radio Access Network; Evolved Universal Terrestrial Radio Access (E-UTRA); Multiplexing and channel coding (Release 8)," 3GPP TS 36.212 V8.5.0 (Dec. 2008).
Third Generation Partnership Project, "Technical Specification Group Radio Access Network; Evolved Universal Terrestrial Radio Access (E-UTRA); Physical layer procedures (Release 8)," 3GPP TS 36.213 V8.5.0 (Dec. 2008).
Third Generation Partnership Project, "Technical Specification Group Radio Access Network; Evolved Universal Terrestrial Radio Access (E-UTRA); Physical layer procedures (Release 8)," 3GPP TS 36.213 V8.8.0 (Sep. 2009).
Third Generation Partnership Project, "Technical Specification Group Radio Access Network; Evolved Universal Terrestrial Radio Access (E-UTRA); Physical layer procedures (Release 9)," 3GPP TS 36.213 V9.0.1 (Dec. 2009).
Third Generation Partnership Project, "Technical Specification Group Radio Access Network; Evolved Universal Terrestrial Radio Access (E-UTRA) Medium Access Control (MAC) protocol specification (Release 9)," 3GPP TS 36.321 V9.1.0 (Dec. 2009).
Third Generation Partnership Project, "Technical Specification Group Radio Access Network; Evolved Universal Terrestrial Radio Access (E-UTRA) Medium Access Control (MAC) protocol specification (Release 8)," 3GPP TS 36.321 V8.8.0 (Dec. 2009).
Third Generation Partnership Project, "Technical Specification Group Radio Access Network; Evolved Universal Terrestrial Radio Access (E-UTRA) Medium Access Control (MAC) protocol specification (Release 8)," 3GPP TS 36.321 V8.40 (Dec. 2008.
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.7.0 (Dec. 2008).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.11.0 (Dec. 2009).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.2.0 (Dec. 2009).
Third Generation Partnership Project, "Technical Specification Group Radio Access Network; Evolved Universal Terrestrial Radio Access (E-UTRA) Radio Resource Control (RRC); Protocol specification (Release 8)," 3GPP TS 36.331 V8.4.0 (Dec. 2008).
Third Generation Partnership Project, "Technical Specification Group Radio Access Network; Evolved Universal Terrestrial Radio Access (E-UTRA) Radio Resource Control (RRC); Protocol specification (Release 8)," 3GPP TS 36.331 V8.8.0 (Dec. 2009).
Third Generation Partnership Project, "Technical Specification Group Radio Access Network; Evolved Universal Terrestrial Radio Access (E-UTRA) Radio Resource Control (RRC); Protocol specification (Release 8)," 3GPP TS 36.331 V9.1.0 (Dec. 2009).
"Official Notice of Rejection", Japanese Patent Application No. 2011-554154, Jul. 2, 2013, 3 pages.
"Official Notice of Rejection (English Translation)", Japanese Patent Application No. 2011-554154, Jul. 2, 2013, 3 pages.
"3rd Generation Partnership Project; Technical Specification Group Radio Access Network; Evolved Universal Terrestrial Radio Access (E-UTRA); Physical layer procedures (Release 8)", 3GPP TS 36.213 V8.5.0, Dec. 2008, 74 pages.
"First Notification of Office Action", Chinese Patent Application No. 201410025525.0, Jun. 15, 2016, 10 Pages.
"First Notification of Office Action", Chinese Patent Application No. 201410024774.8, Jun. 22, 2016, 5 pages.
"First Notification of Office Action (English Translation)", Chinese Patent Application No. 201410025525.0, Jun. 15, 2016, 7 pages.
"First Notification of Office Action (English Translation)", Chinese Patent Application No. 201410024774.8, dated Jun. 22, 2016, 7 pages.
"Notice of Allowance", Japanese Patent Application No. 2015-147221, dated Aug. 9, 2016, 3 pages.
"Notice of Allowance (English Translation)", Japanese Patent Application No. 2015-147221, dated Aug. 9, 2016, 3 pages.
"Patent Abstract of China", Chinese Patent Application No. 101594211, Dec. 2, 2009, 2 pages.
"Patent Abstract of China", Chinese Patent Application No. 101789851, Jul. 28, 2010, 2 pages.
"Patent Abstract of China", Chinese Patent Application No. 101588226, Nov. 25, 2009, 2 pages.
"Patent Abstract of China", Chinese Patent Application No. 101572585, Jan. 2, 2013, 2 pages.
"Patent Abstracts of China", Chinese Patent Application No. 101588224, Nov. 25, 2009, 2 pages.
"PUCCH resource region for LTE-A", 3GPP Tdoc R1-090077, 3GPP TSG RAN WG1 Meeting #55b Ljubljana, Slovenia, Jan. 12-16, 2009, 5 pages.
"Office Action", Korean Patent Application No. 10-2012-7004163, dated Dec. 23, 2015, 4 pages.
"Office Action (English Translation)", Korean Patent Application No. 10-2012-7004163, dated Dec. 23, 2015, 4 pages.
Samsung, "CQI handling during DRX", 3GPP Tdoc R2-071901, 3GPP TSG-RAN2 Meeting #58, Kobe, Japan, May 7-11, 2007, 4 pages.
"Taiwanese Examination Notification", Taiwanese Patent Application No. 104112942, dated Oct. 13, 2016, 5 pages.
"Taiwanese Examination Notification (English Translation)", Taiwanese Patent Application No. 104112942, dated Oct. 13, 2016, 4 Pages.
"Korean Office Action", Korean Patent Application No. 10-2017-7005725, dated Apr. 11, 2017, 4 pages.
"Korean Office Action (English Translation)", Korean Patent Application No. 10-2017-7005725, dated Apr. 11, 2017, 4 pages.
"LTE; Evolved Universal Terrestrial Radio Access (E-UTRA); Physical layer procedures (3GPP TS 36.213 version 8.3.0 Release 8)", ETSI TS 136 213 V8.3.0, Nov. 2008, 47 pages.
"Some aspects of PUCCH/PUSCH transmission over multiple component carriers", 3GPP Tdoc R1-090208, 3GPP TSG RAN WG1 #55bis, Ljubljana, Slovenia, Jan. 12-16, 2009, 5 pages.

* cited by examiner

METHOD AND APPARATUS FOR SELECTING AND RESELECTING AN UPLINK PRIMARY CARRIER

CROSS REFERENCE TO RELATED APPLICATIONS

This application is a continuation of U.S. application Ser. No. 12/721,815 filed Mar. 11, 2010, which claims the benefit of U.S. Provisional Application No. 61/218,271 filed Jun. 18, 2009 and U.S. Provisional Application No. 61/159,665 filed Mar. 12, 2009, all of which are incorporated by reference as if fully set forth.

FIELD OF INVENTION

This application is related to wireless communications.

BACKGROUND

In multicarrier communications, reporting of downlink (DL) information on the uplink (UL) is typically performed for one DL carrier at a time. Therefore, existing multicarrier communication systems are lacking techniques for reporting control information on the UL for more than one concurrent DL carriers.

For example, a Third Generation Partnership Project (3GPP) long term evolution (LTE) system is a multicarrier communications system. For the LTE DL direction, a transmission scheme based on an orthogonal frequency division multiple access (OFDMA) air interface is used. According to OFDMA, a wireless transmit/receive unit (WTRU) may be allocated by an evolved Node-B (eNB) to receive its data anywhere across the entire LTE transmission bandwidth. For the LTE UL direction, single-carrier (SC) transmission is used based on discrete Fourier transform-spread-OFDMA (DFT-S-OFDMA), or equivalently, single carrier frequency division multiple access (SC-FDMA). A WTRU will transmit in the LTE UL direction only on a limited, yet contiguous set of assigned sub-carriers in an FDMA arrangement.

FIG. 1 illustrates the mapping of a transport block 10 to an LTE carrier 20, for UL or DL transmission. Layer 1 (L1) 30 receives information from a hybrid automatic repeat request (HARQ) entity 40 and a scheduler 50, and uses it to assign a transport block 10 to the LTE carrier 20. As shown in FIG. 1, a UL or DL LTE carrier 20, or simply a carrier 20, is made up of multiple sub-carriers 60. An eNB may receive a composite UL signal across the entire transmission bandwidth from one or more WTRUs at the same time, where each WTRU transmits on a subset of the available transmission bandwidth or sub-carriers.

LTE-Advanced (LTE-A) is currently being developed by the 3GPP standardization body in order to further improve achievable throughput and coverage of LTE-based radio access systems, and to meet the international mobile telecommunications (IMT) advanced requirements of 1 Gbps and 500 Mbps in the DL and UL directions, respectively. Among the improvements proposed for LTE-A are carrier aggregation and support of flexible bandwidth arrangements. LTE-A proposes to allow DL and UL transmission bandwidths to exceed the 20 MHz limit in LTE, for example, permitting 40 MHz or 100 MHz bandwidths. In this case, a carrier may occupy the entire frequency block. LTE-A proposes to allow for more flexible usage of the available paired spectrum. For example, LTE may be limited to operate in symmetrical and paired FDD mode where, for example, both the DL and UL may have 10 MHz (or 20 MHz) transmission bandwidths.

In contrast, LTE-A proposes to also operate in asymmetric configurations where, for example, a DL bandwidth of 10 MHz may be paired with a UL bandwidth of 5 MHz. In addition, LTE-A proposes composite aggregate transmission bandwidths, that may be backwards compatible with LTE. By way of example, the DL may include a first 20 MHz carrier plus a second 10 MHz carrier, which is paired with a UL 20 MHz carrier. Carriers transmitted concurrently in the same UL or DL direction are referred to as component carriers (CCs). The composite aggregate transmission bandwidths of the CCs may not necessarily be contiguous in the frequency domain. Continuing the example, the first 10 MHz CC may be spaced by 22.5 MHz in the DL band from the second 5 MHz DL CC. Alternatively, operation may use contiguous aggregate transmission bandwidths. By way of example, a first DL CC of 15 MHz may be aggregated with another 15 MHz DL CC and paired with a UL carrier of 20 MHz.

In the LTE system DL direction, WTRUs transmit their data (and in some cases their control information) on the physical downlink shared channel (PDSCH). The transmission of the PDSCH is scheduled and controlled by the eNB using a DL scheduling assignment, which is carried on a physical downlink control channel (PDCCH). As part of the DL scheduling assignment, the WTRU receives control information on the modulation and coding scheme (MCS) and DL resources allocation, (i.e., the indices of allocated resource blocks). Then, if a scheduling assignment is received, the WTRU decodes its allocated PDSCH resources on the correspondingly allocated DL resources.

In the LTE-A radio access system, at least one PDSCH may be transmitted to a WTRU on more than one assigned CC. Using the carrier aggregation mechanism, different approaches for allocating PDSCH resources on more than one CC have been proposed.

In an LTE-A system, the PDCCHs, (or downlink control information (DCI) messages contained therein carrying the assignment information), may be separately transmitted for the CCs containing the accompanying PDSCH transmissions. For example, if there are two CCs, there are two separate DCI messages on each CC corresponding to the PDSCH transmissions on each CC, respectively. Alternatively, the two separate DCI messages for the WTRU may be sent on one CC, even though they may pertain to accompanying data, or PDSCH transmissions on different CCs. The separate DCI messages of PDCCHs for at least one WTRU may be transmitted in one or in multiple carriers, and not necessarily all of them on every CC. For example, a first DCI transmission on the PDCCH pertaining to the PDSCH allocation on a first CC is also contained on this first CC, but the second DCI to that WTRU PDCCH transmission pertaining to the PDSCH allocation on a second CC is contained on this second CC.

The DCI carrying the assignment information for PDSCHs on more than one CC may be encoded jointly and carried by one single joint DCI control message, or PDCCH message. For example, a single DCI or PDCCH or control message carrying an assignment of PDSCHs or data resources on two CCs is received by the WTRU. Alternatively, the joint PDCCH for a WTRU or group of WTRUs may be transmitted in one or multiple carriers.

In an LTE-A system using carrier aggregation, one asymmetrical scenario occurs whereby a WTRU is configured with a higher number of DL carriers than UL carriers. A one one-to-one mapping between a given DL carrier and a UL carrier cannot be performed as it is the case for LTE.

Of particular interest is the UL carrier assignment for the physical uplink control channel (PUCCH), which is used to carry the HARQ feedback, and the channel quality indicator (CQI)/precoding matrix indicator (PMI)/rank indicator (RI). Furthermore, there is interest in UL carrier assignment of the scheduling request (SR) on a physical random access channel (PRACH), and the buffer status and power headroom reporting on the UL synchronization channel (SCH). If more than one DL carrier is mapped to a single UL carrier, (i.e., a single PUCCH), collisions may potentially be created in the L1 HARQ feedback.

SUMMARY

A method and apparatus are described for using a UL primary carrier for LTE-A to support the need of HARQ feedback, a CQI, an SR, power headroom, and at least one buffer status report in the context of asymmetrical deployment and symmetrical deployment.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of device capable of operating in a wireless environment.

When referred to hereafter, the terminology "base station" includes but is not limited to a Node-B, a site controller, an access point (AP), or any other type of interfacing device capable of operating in a wireless environment.

The network may assign at least one DL carrier and/or at least one UL carrier as a primary DL carrier and a primary UL carrier, respectively. In multi-carrier operation, a WTRU may be configured to operate with two or more carriers, (i.e., frequencies or cells). Each of these carriers may have distinct characteristics and logical association with the network and the WTRU, and the operating frequencies may be grouped and referred to as a primary or anchor carrier, and a supplementary or secondary carrier.

Figure 1:
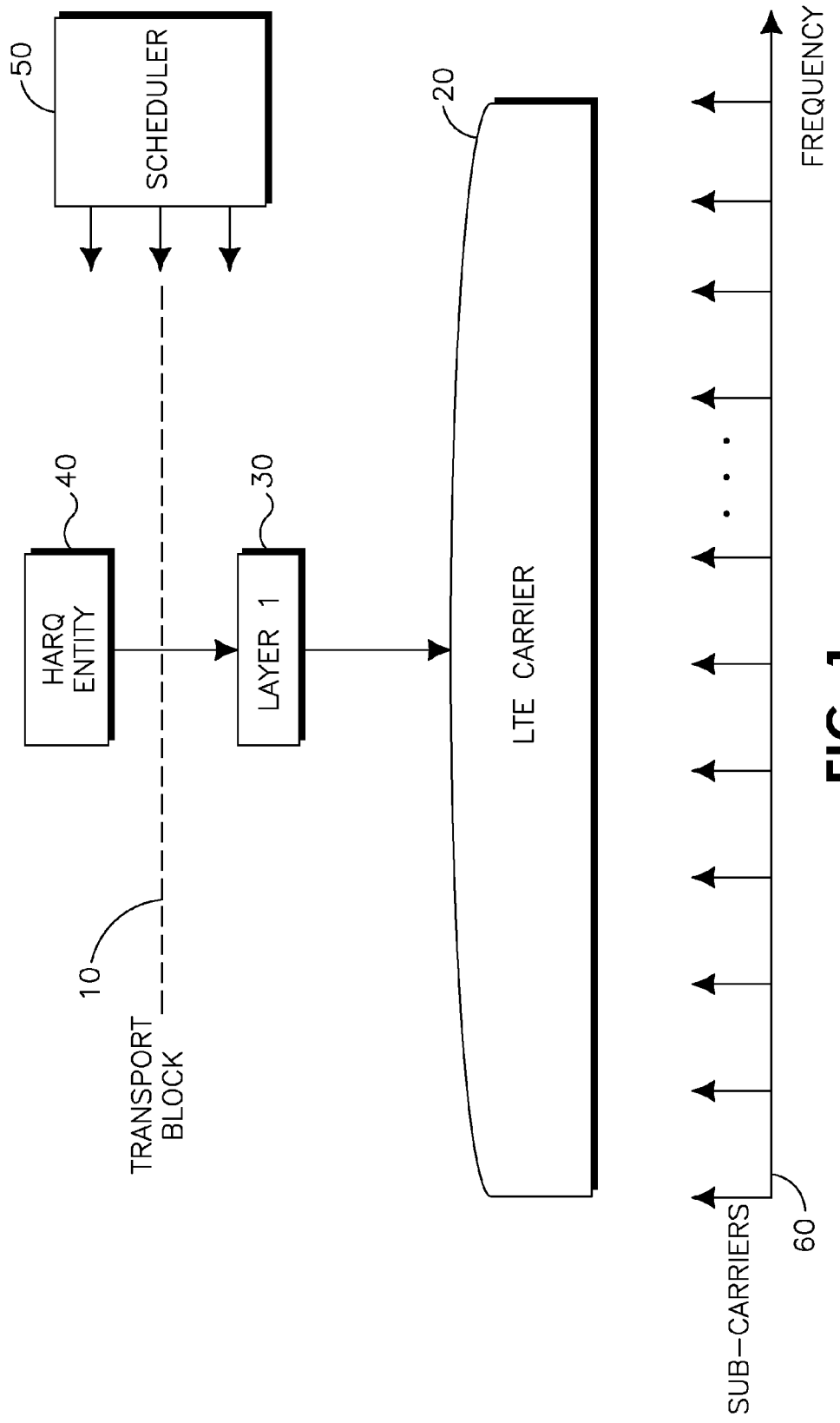
FIG. 1 shows the principle of an LTE transmission.
Figure 2:
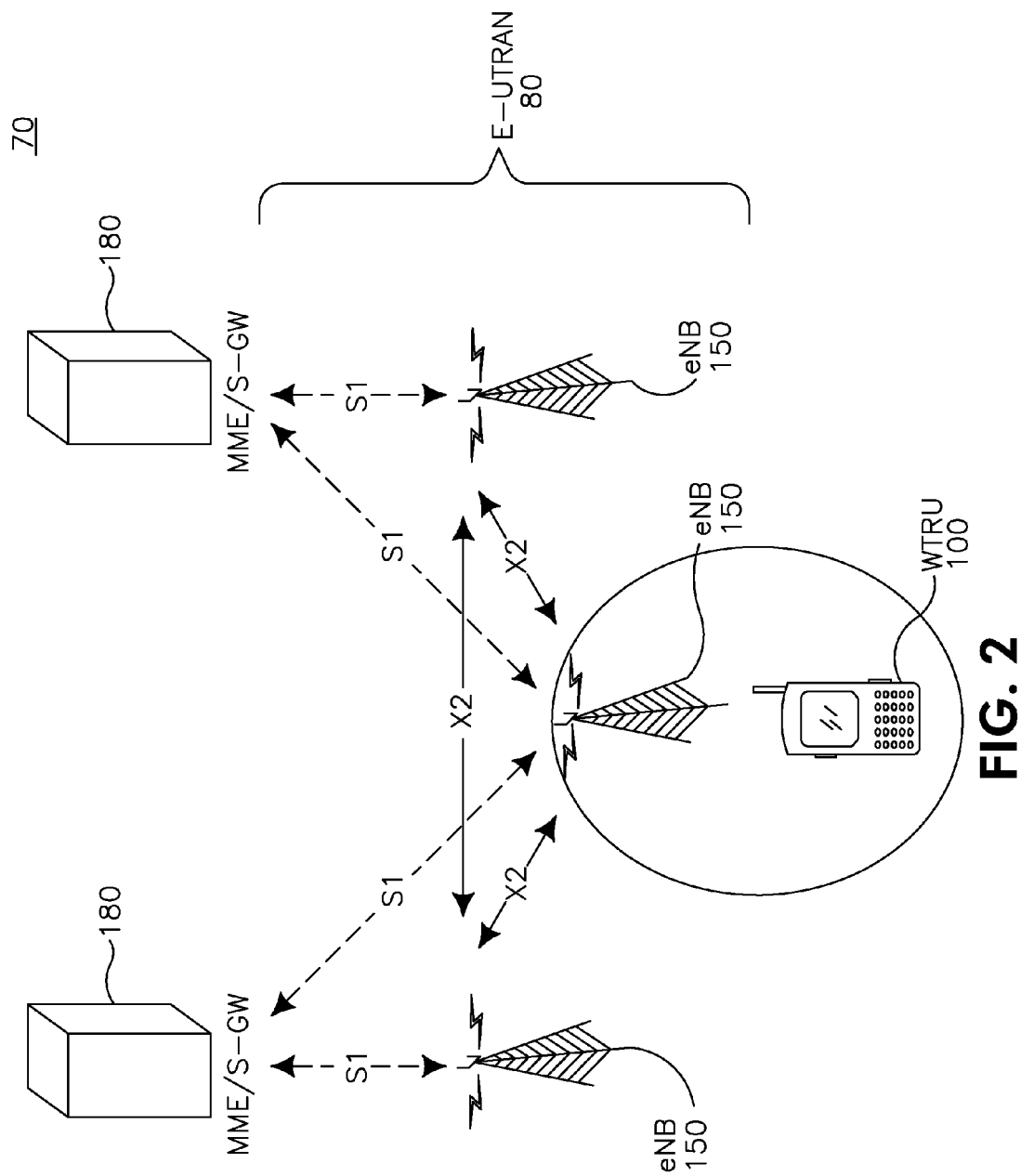
FIG. 2 shows an example wireless communication system including a plurality of wireless transmit/receive units (WTRUs) and an eNB.

FIG. 2 shows an LTE wireless communication system/access network 70 that includes an evolved-universal terrestrial radio access network (E-UTRAN) 80. The E-UTRAN 80 includes several eNBs 150. A WTRU 100 is in communication with an eNB 150. The eNBs 150 interface with each other using an X2 interface. Each of the eNBs 150 interface with a mobility management entity (MME)/serving gateway (S-GW) 180 through an S1 interface. Although a single WTRU 100 and three eNBs 150 are shown in FIG. 2, it should be apparent that any combination of wireless and wired devices may be included in the LTE wireless communication system/access network 70.

Figure 3:
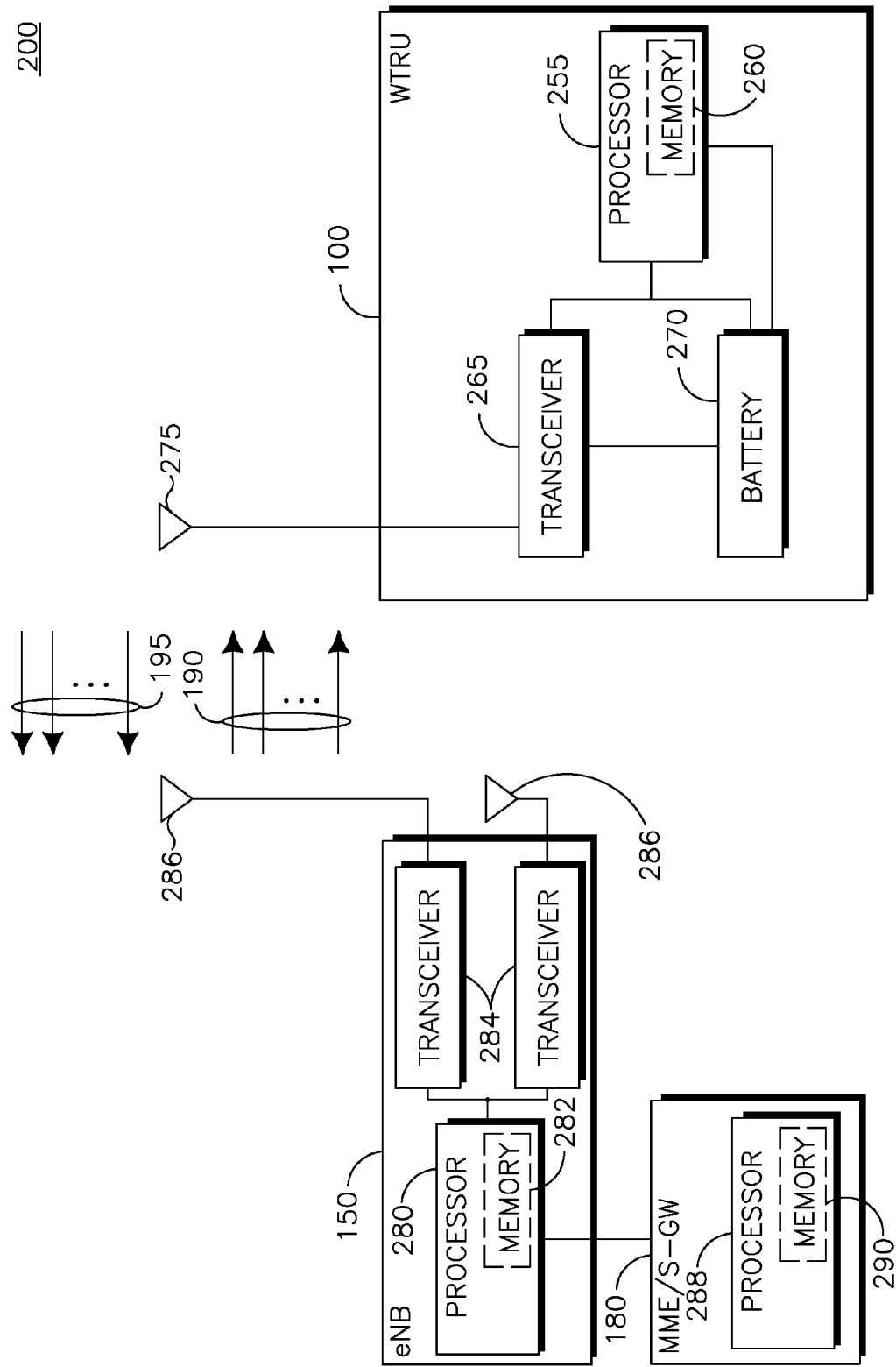
FIG. 3 shows an example functional block diagram of a WTRU and eNB of FIG. 3.

FIG. 3 is a block diagram of an LTE wireless communication system 200 including the WTRU 100, the eNB 150, and the MME/S-GW 180. As shown in FIG. 3, the WTRU 100, the eNB 150 and the MME/S-GW 180 are configured to select and reselect a UL primary carrier.

In addition to the components that may be found in a typical WTRU, the WTRU 100 includes a processor 255 with an optional linked memory 260, at least one transceiver 265, an optional battery 270, and an antenna 275. The processor 255 is configured to select and reselect a UL primary carrier. The transceiver 265 is in communication with the processor 255 and the antenna 275 to facilitate the transmission and reception of wireless communications. In case a battery 270 is used in the WTRU 210, it powers the transceiver 265 and the processor 255.

In addition to the components that may be found in a typical eNB, the eNB 150 includes a processor 280 with an optional linked memory 282, transceivers 284, and antennas 286. The processor 280 is configured to select and reselect a UL primary carrier. The transceivers 284 are in communication with the processor 280 and antennas 286 to facilitate the transmission and reception of wireless communications. The eNB 150 is connected to the MME/S-GW 180 which includes a processor 288 with an optional linked memory 290.

As shown in FIG. 3, the WTRU 100 is in communication with the Node-B 150, and both are configured to perform a method wherein UL transmissions from the WTRU 100 are transmitted to the Node-B 150 using multiple UL carriers 190, and DL transmissions are handled using multiple carriers 195.

The network may assign at least one DL and/or at least one UL carrier as a primary DL carrier and a primary UL carrier, respectively. In multi-carrier operation a WTRU may be configured to operate with two or more carriers or also referred to as frequencies or cells. Each of these carriers may have distinct characteristics and logical association with the network and the WTRU, and the operating frequencies may be grouped and referred to as a primary or primary carrier, and a supplementary or secondary carrier.

A "primary carrier" is a CC that provides control signaling, (e.g., PDCCH scheduling), for UL and DL shared channel transmissions of a subset of UL and DL CCs.

UL Primary Carrier Selection

A UL primary carrier may be used to consolidate HARQ feedback and CQI/PMI/RI reporting, as well as to centralize SRs, power headroom, and buffer status report to support multiple UL carriers. In each WTRU, it may be assumed that there is one HARQ entity with multiple HARQ processes per CC.

The following method may be performed to select a UL primary carrier. Assume that a WTRU is configured with y activated DL carriers, (i.e., carriers 1D, 2D, . . . , yD) and z activated UL carriers (i.e., carriers 1U, 2U, . . . , zU). If the WTRU is configured with separate PDCCH coding, a candidate PDCCH may be received on each of the y activated DL carriers.

Initial selection of the UL primary carrier may be performed during an initial random access channel (RACH) procedure. Because there are multiple UL carriers, any of the z activated UL carriers may serve as a UL primary carrier. The UL primary carrier may be common in the cell or it may be WTRU specific.

One approach may be to select a UL carrier that successfully completes an initial RACH procedure as a default UL primary carrier. The network may control which UL primary carrier is used by rejecting RACH attempts on undesired UL carriers. Alternatively, the network may signal desired or undesired UL carriers over system information on one or multiple DL carriers.

Following, or combined with, a cell selection procedure, the WTRU may perform an initial UL primary carrier selection. Assuming that the RACH procedure and the information carried over the system information blocks (SIBs) associated with the RACH procedure is similar to LTE, the WTRU may initiate a RACH procedure over a common UL carrier that is common to all WTRUs camping on the network. The network may force the UL primary carrier selection implicitly by only identifying PRACH resources on particular UL carriers.

Alternatively, the WTRU may determine the UL primary carrier based on RRC signaling, either explicitly or implicitly. For instance, the UL primary carrier may implicitly correspond to the first UL carrier provided in the RRC message configuring the WTRU. Alternatively, the primary UL carrier may implicitly correspond to a UL carrier for which specific information elements, (e.g., pertaining to feedback), are provided. Alternatively, as part of a modified RACH procedure, a new bit field in a RACH response message, or radio resource control (RRC) or medium access control (MAC) control element (CE) signaling in a message sent by the network, may indicate which carrier of the z activated UL carriers will serve as the UL primary carrier, which may be also used for the remainder of the RACH procedure.

Another approach may be that the WTRU selects a UL carrier for the RACH procedure and as a UL primary carrier based on its universal subscriber identity module (USIM) identity modulo z1 (number of UL carriers) available in the cell based on system information broadcasted over the cell. In this case, the system information may indicate the UL carriers and which of these carriers have PRACH resources from which the selection may be made.

Reselection or reconfiguration of the UL primary carrier, (or a one-direction intra-cell handover), may be performed in accordance with one of several possible methods. An eNB initiated RRC procedure, a new MAC CE message, or a PDCCH code point may trigger a change of the UL primary carrier specific to a particular WTRU. This may also be part of a one-direction intra-cell handover procedure where only one or more UL carriers are affected and the DL carriers remain unchanged. The procedure used to change the UL primary carrier must be robust because if a WTRU sends HARQ feedback or other information on the wrong UL channel, this may be detrimental to other WTRUs in the cell.

A RACH-less one direction intra-cell handover procedure may be initiated by an RRC message to change from a first (i.e., original) UL primary carrier to a second (i.e., new) UL primary carrier. Since the RRC message does not contain an explicit activation time, the general approach is for the WTRU 100 to send an SR message to indicate to the network that an RRC message triggering the one direction intra-cell handover has been received, and the WTRU 100 is changing to (i.e., reselecting) the second (i.e., new) UL primary carrier.

Figure 4:
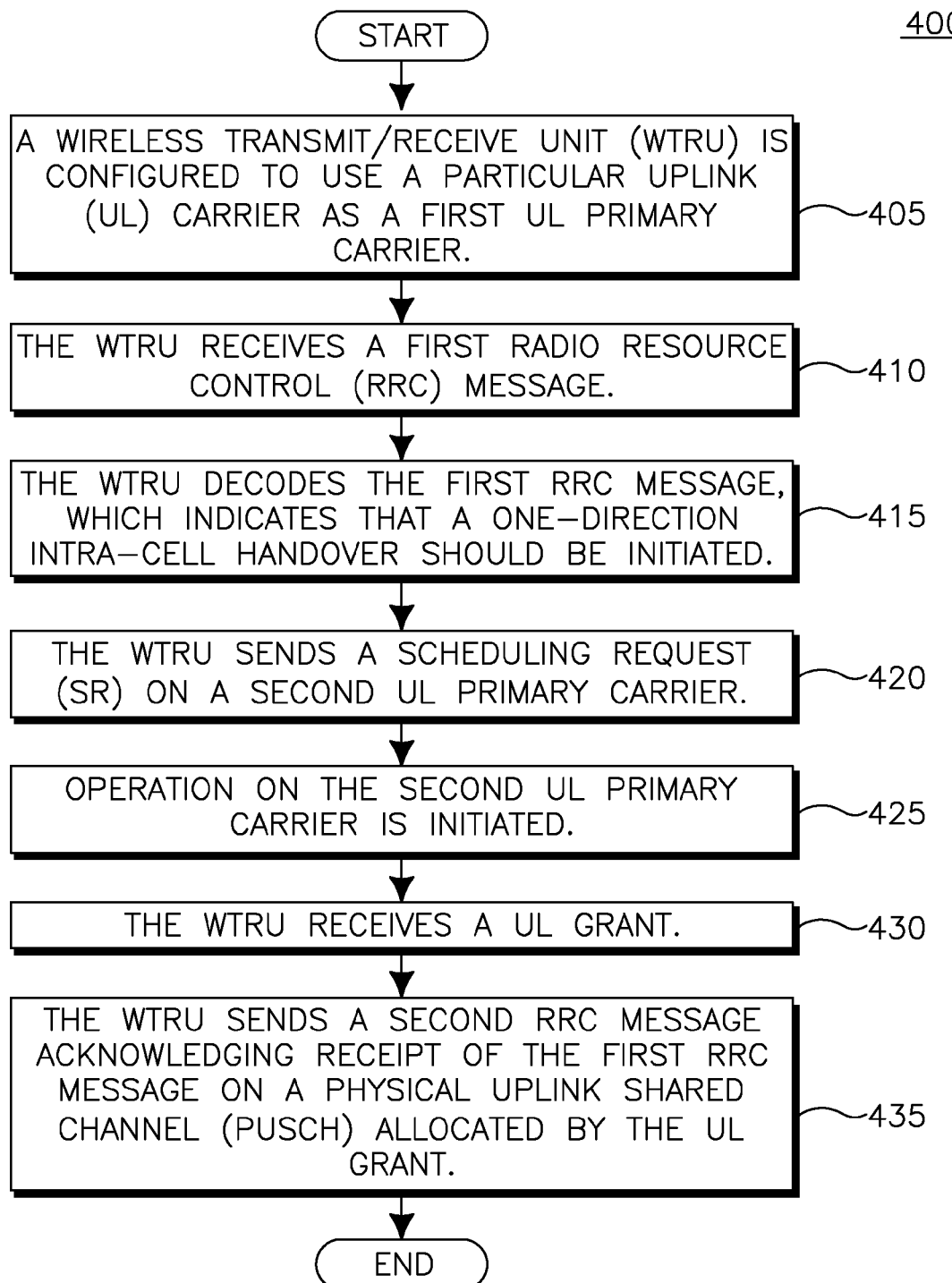
FIG. 4 is a flow diagram of a RACH-less one-direction intra-cell handover procedure.

FIG. 4 is a flow diagram of a RACH-less one-direction intra-cell handover procedure 400. In the procedure 400, the WTRU 100 is initially configured to use a particular UL carrier (e.g., 1U) as a first UL primary carrier (405). The WTRU 100 receives a first RRC message (410) in subframe k.

The first RRC message is then decoded by the WTRU 100 and indicates that a one-direction intra-cell handover should be initiated (415). The first RRC message may contain the following fields: an identity (ID) field that identifies a second (i.e., new) UL primary carrier, a field indicating the assigned PUCCH resources on the second UL primary carrier for an SR (optional, may be the same as the first UL primary carrier), and optionally a field indicating that the first RRC message constitutes a one-direction UL handover. This may be implicitly indicated by the presence of a specific field, such as the new UL primary carrier ID. The WTRU 100 then sends an SR, (i.e., subframe k+1), on the second UL primary carrier (420) using the new resources indicated in the first RRC message, or the same resources used by the first UL primary carrier. The WTRU 100 may also send the SR on the first UL primary carrier. Operation on the second UL primary carrier is initiated (425) immediately after the SR has been sent, (i.e., subframe_k+l+1), or after a pre-determined delay after transmission of the SR. The WTRU 100 receives a UL grant (430) requesting that an acknowledgment be sent indicating that the first RRC message was received. The WTRU 100 then sends a second RRC message, acknowledging receipt of the first RRC message, on a PUSCH allocated by the UL grant (435). Optionally, the above procedure for changing the first UL primary carrier is utilized if the WTRU 100 determines that the timing advance applicable to the second UL primary carrier is the same as the first UL primary carrier. Such a determination may be for instance based on the presence of an indication in the RRC message or MAC CE, or based on whether or not the second UL primary carrier is in the same frequency band as the first UL primary carrier.

A one-direction intra-cell handover procedure may be initiated by an RRC message, as in the previous procedure 400, but the WTRU 100 receiving the RRC message initiates a RACH procedure on the new UL primary carrier. The RRC message may contain RACH dedicated resources.

Figure 5:
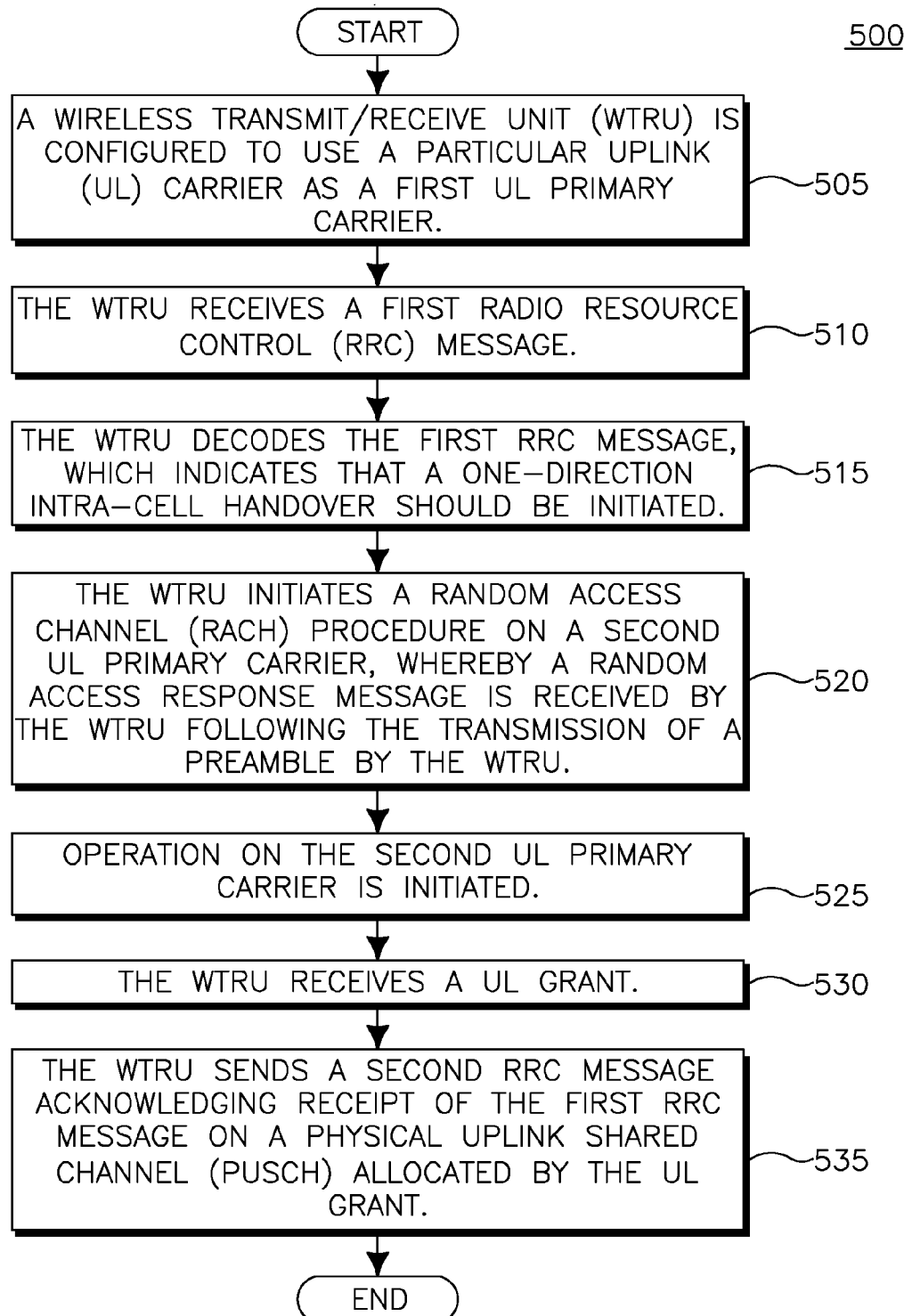
FIG. 5 is a flow diagram of a one-direction intra-cell handover procedure.

FIG. 5 is a flow diagram of a one-direction intra-cell handover procedure 500. In the procedure 500, the WTRU 100 is initially configured to use a particular UL carrier (e.g., 1U) as a first UL primary carrier (505). The WTRU 100 receives a first RRC message (510) in subframe k. The first RRC message is then decoded by the WTRU 100 and indicates that a one-direction intra-cell handover should be initiated (515). The first RRC message may contain the following fields: an ID field identifying a second (i.e., new) UL primary carrier ID, a field indicating the assigned PUCCH resources on the second UL primary carrier for an SR (optional, may be the same as the first UL primary carrier), an optional field indicating RACH dedicated resources (i.e., preamble), and a field indicating that this message constitutes a one-direction UL handover. This may be implicitly indicated by the presence of a specific field, such as the new UL primary carrier ID.

The WTRU 100 then initiates a RACH procedure on the second UL primary carrier (520) whereby a random access response message is received (subframe k_1+1) by the WTRU 100, following the transmission of a preamble by the WTRU 100. The random access response message may contain timing alignment or timing advance information. Alternatively, the WTRU 100 may also initiate the RACH procedure on the first UL primary carrier. Operation on the second UL primary carrier is initiated (525) immediately after the random access response message has been received by the WTRU 100 (i.e., subframe_k+l+1), or after a predetermined delay after the RACH message has been received. The WTRU 100 receives a UL grant (530) requesting that an acknowledgment be sent indicating that the first RRC message was received. The WTRU 100 then sends a second RRC message acknowledging receipt of the first RRC message on a PUSCH allocated by the UL grant (535). In case the WTRU 100 fails to receive the random access response message by the expiration of a timer, the WTRU 100 considers that the one-direction intra-cell handover has failed, and reverts to the configuration prior to reception of the RRC message. Optionally, the above procedure for changing the UL primary carrier may be utilized if the WTRU 100 determines that the timing advance applicable to the second UL primary carrier is not the same as the first primary UL carrier. Such a determination may be, for instance, based on the presence of an indication in the RRC message or MAC CE, or based on whether or not the second UL primary carrier is in the same frequency band as the first UL primary carrier.

In any of the above procedures, the WTRU 100 may determine the initial transmission power on the second UL primary carrier, (e.g., PUCCH transmission), by using at least one of the following methods. The WTRU 100 may determine the transmission power by applying an offset to the transmission power used in the first UL primary carrier. Alternatively, the WTRU 100 may apply the same power control formula used in the first UL primary carrier, with the same calculated path loss (PL) parameter, but with all or a subset of other parameters specific to the second UL primary carrier. Such offset or parameters may be obtained from the message (RRC or MAC) indicating that the first UL primary carrier should be changed.

A one-direction UL handover procedure may be initiated by an RRC message, but after the RRC message is sent, operation remains on the previous UL primary carrier (for an idle period) until the WTRU 100 sends a RRC acknowledgment on the PUSCH resource. The network may not schedule traffic to avoid confusion on the PUCCH resources to be used during the transition.

Figure 6:
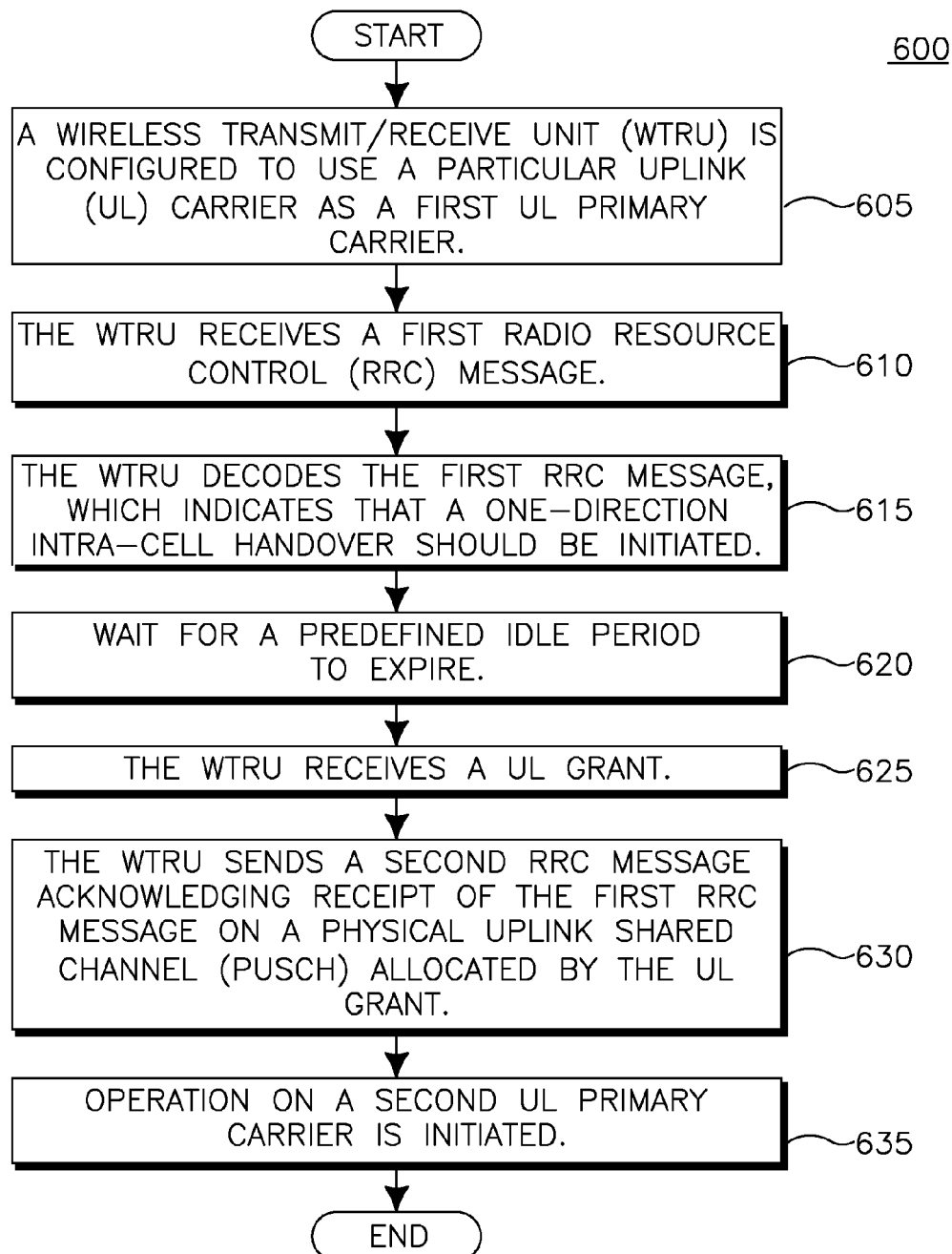
FIG. 6 is a flow diagram of a one-direction intra-cell handover procedure.

FIG. 6 is a flow diagram of a one-direction intra-cell handover procedure 600. As shown in FIG. 6, the WTRU 100 is initially configured to use a particular UL carrier (e.g., 1U) as a first UL primary carrier (605). The WTRU 100 receives a first RRC message (610) in subframe k.

The first RRC message is then decoded by the WTRU 100 and indicates that a one-direction intra-cell handover should be initiated (615). The first RRC message may contain the following fields: An ID field that identifies a second (i.e., new) UL primary carrier, a field indicating the assigned PUCCH resources on the second UL primary carrier for an SR (optional, may be the same as the first UL primary carrier), and an RRC field indicating that this message constitutes a one-direction UL handover. This may be implicitly indicated by the presence of a specific field, such as the new UL primary carrier ID.

After waiting for a predefined idle period to expire (620), which may allow for the WTRU 100 to correctly receive and process the RRC message, the network schedules a UL grant requesting that an acknowledgment be sent indicating that the first RRC message was received. The WTRU 100 receives the UL grant (625) and sends a second RRC message acknowledging receipt of the first RRC message on a PUSCH allocated by the UL grant (630). Operation on the second (i.e., new) UL primary carrier is initiated (635) immediately after the second RRC message has been sent, or at a predefined delay thereafter.

Figure 7:
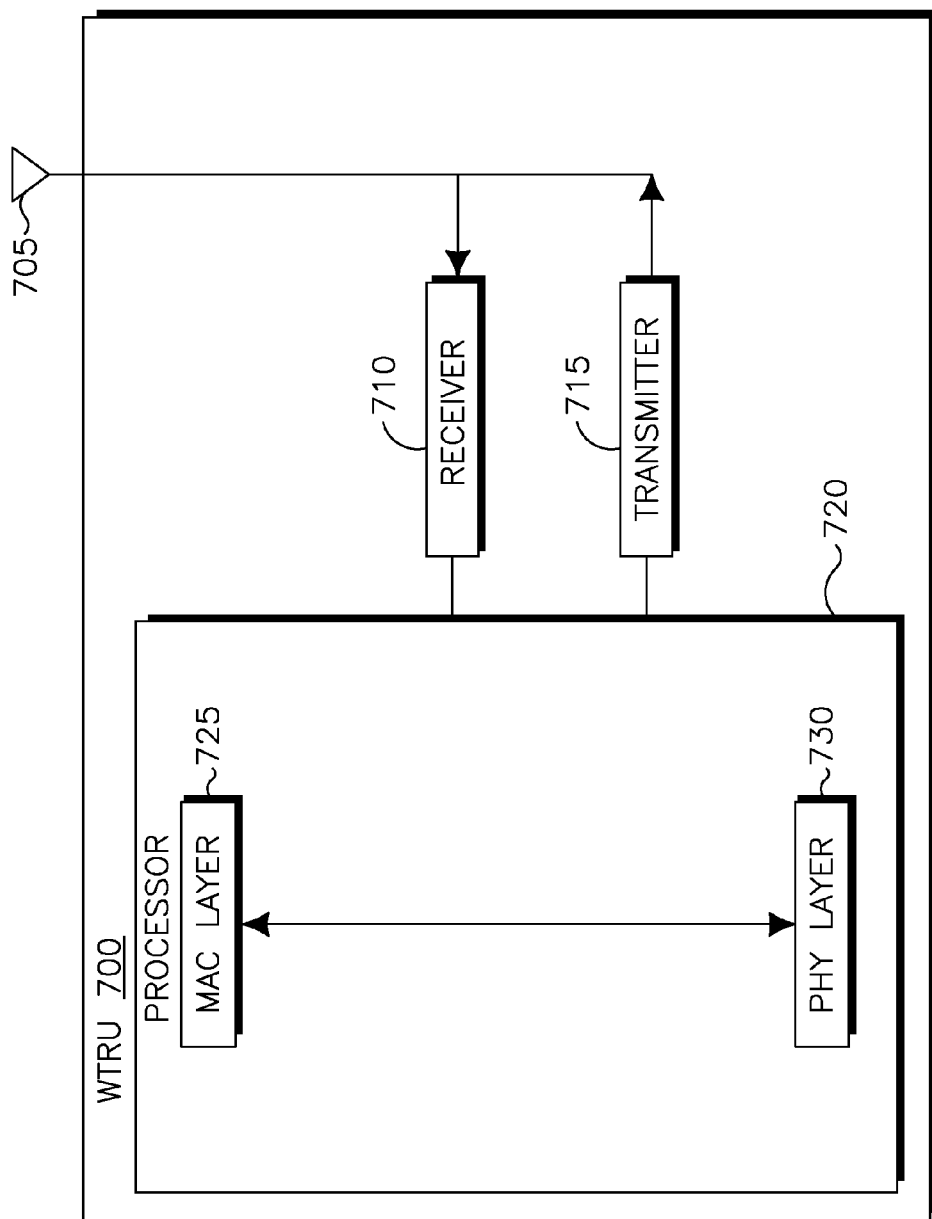
FIG. 7 shows an example of a block diagram of a WTRU.

FIG. 7 shows an example of a block diagram of a WTRU 700. The WTRU 700 includes at least one antenna 705, a receiver 710, a transmitter 715 and a processor 720. The processor 720 may include a MAC layer 725 and a physical (PHY) layer 730.

A one-direction UL handover procedure may be implemented to change a UL primary carrier using a new MAC CE command, referred to as a MAC_CE_Primary_Change command.

Figure 8:
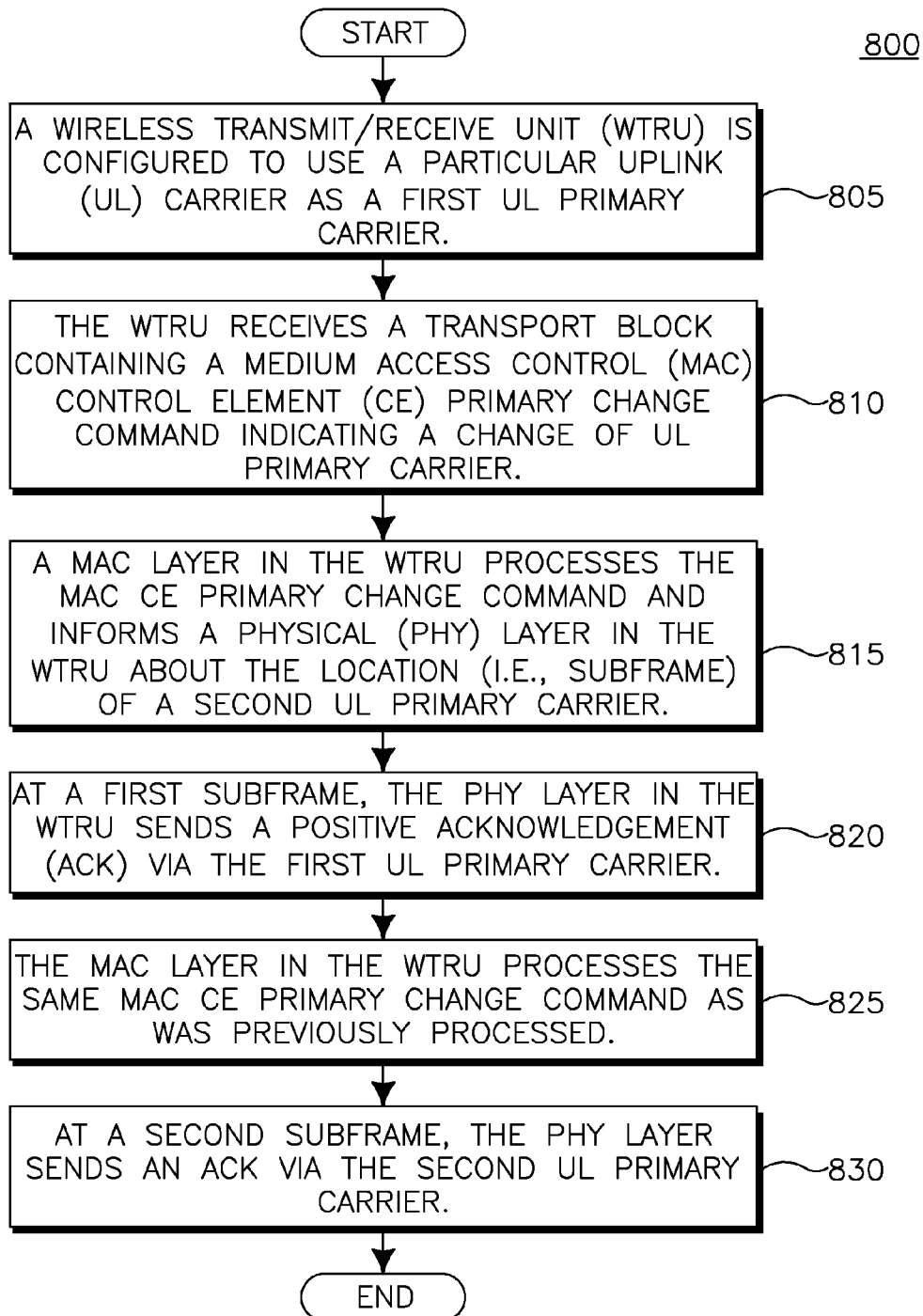
FIG. 8 is a flow diagram of a one-direction UL handover procedure.

FIG. 8 is a flow diagram of a one-direction UL handover procedure 800. The WTRU 700 is initially configured to use a particular UL carrier (e.g., 1U) as a first UL primary carrier (805). At subframe k, the WTRU 700 receives a transport block containing a MAC CE indicating a change of UL primary carrier (MAC_CE_Primary_Change command) (810). The MAC_CE_Primary_Change command is processed by the MAC layer 725, which then informs the PHY layer 730 that the new UL primary carrier will be (e.g., 2U) at subframe_k+4+n (815), where n is a pre-determined number typically equal to (or higher than) 1. The MAC_CE_Primary_Change command may contain a bit field indicating the new UL primary carrier ID. At subframe+k+4, the PHY layer 730 sends a positive acknowledgement (ACK) using the still valid UL primary carrier 1U (820), (the network at the reception of the ACK knows that the WTRU 700 may start operating on the new UL primary carrier 2U in terms of HARQ feedback. For robustness, the network may send another MAC_CE_Primary_Change command to confirm that the ACK received was not a false positive. Also, the same occurs if no ACK was received. During this transition time, the network may avoid assigning the same PUCCH resources of both UL carriers to other WTRUs. The WTRU 700 processes an identical MAC_CE_Primary_Change as was previously processed at subframe_k+4+n. The MAC layer 725 does nothing with it since the carrier ID bit field is the same as the existing UL primary carrier. At subframe_k+4+n+4, the PHY layer 730 sends an ACK using the new UL primary carrier 2U (830). The reception of the ACK by the network confirms that the primary carrier change has occurred for the WTRU 7

WTRU Autonomous UL Primary Carrier Selection

The WTRU 700 may initiate a UL primary reselection procedure autonomously. Triggering criteria may be associated with events indicating a failure of the existing UL primary carrier. The procedure performed by the WTRU 700 may be similar to the initial UL primary assignment procedure using PRACH described above.

The methods described above are a form of a simplified intra-cell reselection or handover procedure. The cell providing the security input parameters may not need to change, and the user plane protocols (packet data convergence protocol (PDCP) and radio link control (RLC)) may not need to be re-established. The UL and potentially the DL primary carriers (or sets of UL and DL carriers) may be switched. One aspect which contrasts from normal handover is that primary reselection or handover may be performed only in one direction (UL or DL).

The new UL primary carrier may or may not be part of one of the previously configured UL carriers. If the new UL primary carrier is part of an existing set of UL carriers in use by the WTRU 700, the signaling and assignment may be simplified by use of PDCCH/PUCCH or MAC CE signaling. If the new primary carrier is not part of the existing UL carrier set RRC dedicated or system information, then signaling may be required to provide detailed carrier information.

Furthermore, some methods define a clear time boundary of when dedicated PUCCH resources should be switched over. This allows maintaining DL traffic activity during the transition, even if two or more HARQ feedbacks are funneled into the UL primary carrier. For example, in procedure 400, all DL HARQ feedbacks are funneled to the previous UL primary carrier until the SR is sent over the new UL primary carrier to signify that the RRC message was correctly received.

A DL primary PDCCH may include DL primary joint PDCCH coding or DL primary separate PDCCH coding. In the DL primary PDCCH, all PDCCHs are transmitted in primary carrier regardless PDCCHs are separately encoded or jointly encoded.

If a DL primary carrier is indicated, then a UL primary carrier may be determined based on the information of DL primary carrier. In other words, the UL primary carrier may be associated with DL primary carrier using mapping rules to map DL primary carrier to UL primary carrier. There is no need to separately signal the UL primary carrier if the DL primary carrier is indicated.

For symmetric UL/DL carriers, a one-to-one mapping is defined or specified between the UL primary carrier and the DL primary carrier. For example, a mapping rule may be: DL primary carrier (DL carrier x) is associated with UL primary carrier (UL carrier y).

Usually $y=f(x)$, where $f(.)$ is fixed function that associates the UL and the DL primary carriers. The method to determine the UL primary carrier works for symmetric number of CCs in the UL and the DL provided $f(.)$ is known.

For asymmetric UL/DL carriers where there are more DL carriers than UL carriers, a mapping rule $f(.)$ may be: if the DL primary carrier is either DL carrier x1 or x2, then the UL primary carrier is the UL carrier y1; if the DL primary carrier is either the DL carrier x3 or x4, then the UL primary carrier is UL carrier y2, and so on.

Alternatively, DL carriers may be made symmetric to UL carriers for the UL primary carrier determination purpose. In this method, a subset of DL carriers is selected and the number of DL carriers in the selected carrier subset is equal to the number of UL carriers. Only the DL carriers in the carrier subset are allowed to be the DL primary carrier. The mapping rule for the DL/UL primary carrier is similar to the case of symmetric UL/DL carriers that may be used. The DL primary carrier subset may be signaled, configured, or predetermined.

The mapping rule may be generalized and other mappings and associations between the UL primary carriers and the DL primary carriers may be used. The mapping rule may be signaled, configured or predetermined.

For asymmetric UL/DL carriers where there are more UL carriers than DL carriers, the following rule or method may be used: UL carriers may be made symmetric to DL carriers for UL primary carrier determination purpose.

In this method, a subset of the UL carriers is selected and the number of UL carriers in the selected carrier subset is equal to the number of DL carriers. Only the UL carriers in the carrier subset are allowed to be UL primary carrier. The mapping rule for the DL/UL primary carrier similar to the case of symmetric UL/DL carriers as described above may be used. The UL primary carrier subset may be signaled, configured, or predetermined.

Alternatively, the UL primary carrier may be indicated in the similar ways as described above in DL non-primary separate PDCCH coding.

Additional variations of the previously described methods may be proposed if the DL primary joint PDCCH approach is used. Where variants for DL primary are not identified, the same solutions as for the non-primary separate coding may be applied.

In joint PDCCH coding, a single PDCCH is received which defines multiple DL or UL assignment on the PDSCH of multiple DL Carriers (Carriers 1D, 2D, . . . , yD) or multiple UL-SCH of the UL carriers (carriers 1U, 2U, . . . , zU). By definition, if such assignment is received in subframe_n−4, only one starting CCE of the PDCCH is defined. The starting CCE may be used to define the first PUCCH resource, which will carry the consolidated HARQ feedback in subframe_n as described previously. If more than one PUCCH resource is required, the following PUCCH resources in terms of cyclic shift are used. Furthermore, the consolidated HARQ feedback may be sent on the PUCCH, even if data is sent by the WTRU 700 on the UL-SCH in the same subframe and same carrier in contrast to LTE.

In another method, dynamic selection is performed on UL carriers used for DL-SCH feedback. In this method, the feedback pertaining to a certain DL-SCH (including HARQ ACK/negative acknowledgement (NACK), CQI, PMI and RI), as well as other control information such as SR may be transmitted on different UL CCs on a dynamic basis. For instance, feedback for a given DL-SCH may always be transmitted from the PUCCH of a given UL CC in case no PUSCH transmission takes place on any UL CC, while in case PUSCH transmission takes place on at least one UL CC, feedback is provided on the PUSCH of one of these UL CCs.

More generally, the selection of the UL CC used for transmission of this information in a given sub-frame may be transmitted on an allowed UL CC which has a PUSCH transmission at this sub-frame if there is any such UL CC. The set of allowed UL CCs may be signaled by higher layers on a semi-static basis. In case there is more than one such allowed UL CC, the WTRU 700 may randomly pick among the allowed UL CCs. Alternatively, the UL CCs are ranked by order by preference (such ranking may be signaled by higher layers). In case there is no UL CC transmitting a PUSCH transmission at this sub-frame, the information may be transmitted on the PUCCH of a pre-determined UL CC (that may be signaled by higher layers). Alternatively, the information may be transmitted on the PUCCH of an UL CC which is not already used for providing feedback for another DL-SCH, if such UL CC is available.

The use of the PUCCH for a certain UL CC may be ruled by setting a ranking between different DL-SCH that may have to use it.

In case there is no UL CC for which the PUCCH is not already used by another DL-SCH, the information may be multiplexed with the information pertaining to the other DL-SCH on the same PUCCH of an UL CC.

Aggregation of UL Control Signaling

In a separate PDCCH coding non-primary carrier, a distinct PDCCH may be received separately and independently on one or more DL carriers, (i.e., carriers 1D, 2D, . . . , yD), with different starting CCEs on each carrier. In the UL primary carrier approach, the multiple HARQ feedbacks resulting from the received PDSCH are consolidated and transmitted on the PUCCH resources of the configured UL primary carrier. Furthermore, the consolidated HARQ feedback may be sent on the PUCCH, even if data is sent by the WTRU 700 on the UL-SCH in the same subframe and same carrier in contrast to LTE, (i.e., UL data and control may be transmitted concurrently in the same subframe of the same carrier).

In a first method, DL carriers, (i.e., carriers 1D, 2D, . . . , yD), are ranked by rules or information sent by a higher layer. For example, a WTRU 700 may rank DL carriers from highest priority to lowest priority, where carrier 1D has the highest priority and carrier yD has the lowest priority. At subframe n−4, one or multiple PDCCHs may be received. The starting CCE of the highest priority carrier, in which a PDCCH was received, is then used to derive the PUCCH resource that is used to carry HARQ feedback. If more than one PUCCH resource is required, the additional PUCCH resources in terms of cyclic shift are used.

Figure 9:
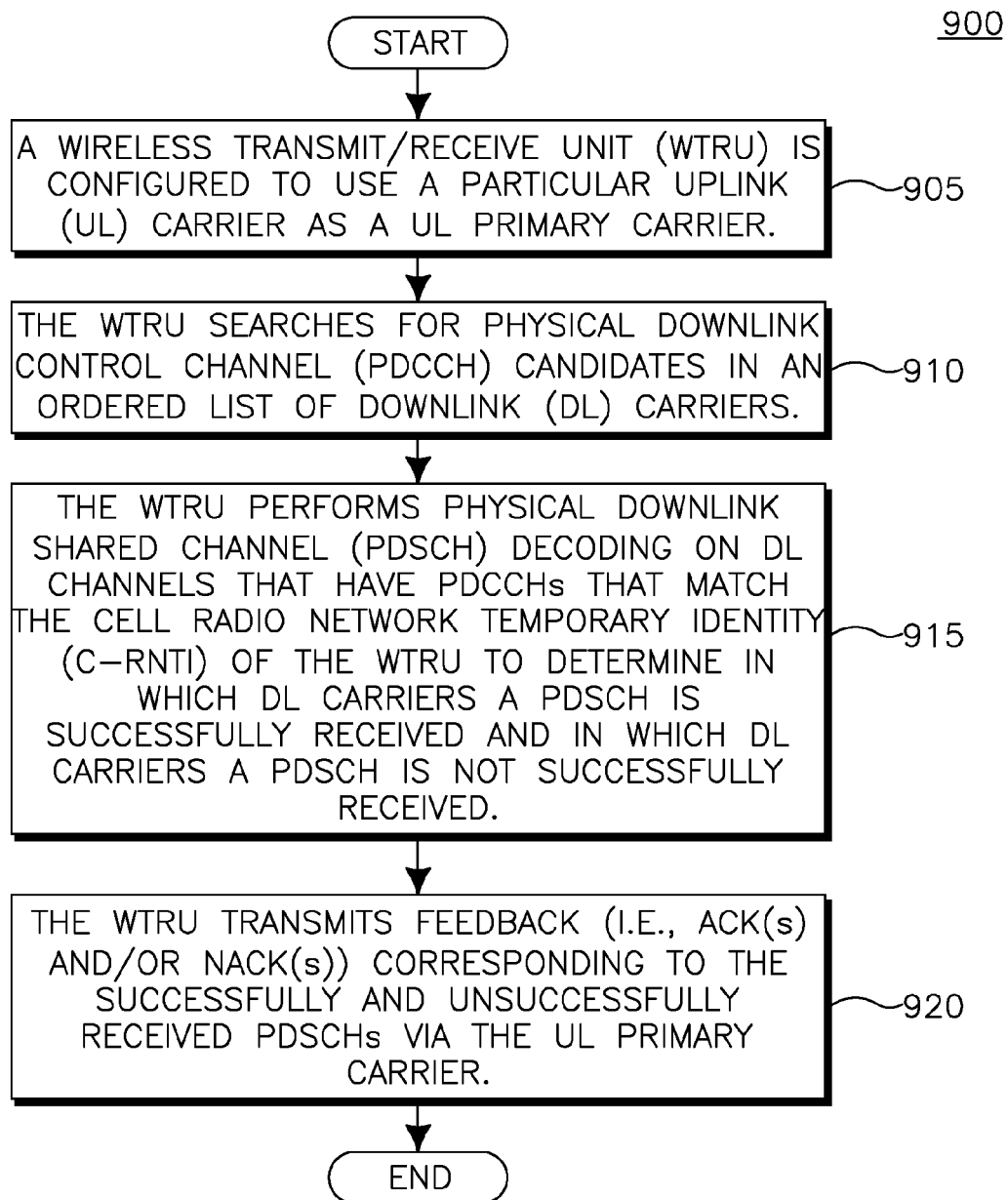
FIG. 9 is a flow diagram of a procedure for sending HARQ feedback.

FIG. 9 is a flow diagram of a procedure 900 for sending HARQ feedback. As shown in FIG. 9, the WTRU 700 is initially configured to use a particular UL carrier (e.g., 1U) as a UL primary carrier (905). The DL carriers are arranged in an ordered list (e.g., 1D to yD). The WTRU 700 searches for PDCCH candidates (910) in DL carriers of WTRU-specific search space of DL (1D, 2D, . . . , yD) in subframe_n−4. Under an assumption that a PDCCH matches with WTRU radio network temporary identity (C-RNTI) on several DL carriers (2D, 3D, 5D) with starting CCE 2n for carrier 2D, an example of a possible result of the PDSCH decoding may be 2D=ACK, 3D=NACK, 5D=ACK, which indicates that a PDSCH in carriers 2D and 5D are received successfully while a PDSCH in carrier 3D is not received successfully (915). In subframe_n, the WTRU 700 sends feedback (i.e., two ACK/NACKs, an ACK and a NACK corresponding to carriers 2D and 3D respectively), via the UL primary carrier (920), using PUCCH format 1b on the PUCCH resource that is determined by the starting address CCE_2n. The third highest priority, carrier 5D, uses the PUCCH resource that is next to the previous PUCCH resource in terms of the cyclic shift. In this case, an ACK corresponding to carrier 5D is sent using format 1a.

Alternatively, to reduce the impact of an ACK in case of a false PDCCH detection, the WTRU 700 may send a discontinuous transmission (DTX) value for a carrier which fails to receive a PDCCH if other carriers received the PDCCH. For example, a DTX indication may be sent when carriers do not receive the PDCCH in subframe_n−4, but are in between the highest priority carrier for which a PDCCH was received and the lowest priority carrier for which a PDCCH was also received. In the previous example, the WTRU 700 sends the value of the ACK/NACK, followed by a DTX/NACK on two (2) PUCCH resources (both using format 1b) at subframe_n.

In a second method, no ranking between carriers is required. At subframe_n−4, one or more PDCCHs are received. For each carrier, Dn, for which a PDCCH with matching CRC was received, the ACK/NACK with PUCCH resource CCE(n)+N_PUCCH(n) is used where CCE(n) is the starting CCE of the received PDCCH on carrier Dn, and N_PUCCH(n) is an offset determined by either providing N_PUCCH(n) by higher layers for each DL carrier, or defining N_PUCCH(n) as the sum of N_PUCCH(1)+NCCE(1)+NCCE(2)+ . . . +NCCE(n), where N_PUCCH(1) is provided by higher layers and NCCE(n) is the total number of CCEs on carrier Dn.

According to the second method, the WTRU 700 may use format 1a for each carrier from which a single ACK/NACK needs to be sent (single codeword), and format 1b for each carrier from which two ACK/NACKs need to be sent (two codewords).

In a third method, no ranking between carriers is required but carriers may be paired with each other. For example, carrier D1 may be paired with carrier D3. This third method may be used when at most one codeword needs to be ACKed or NACKed from each carrier. At subframe_n−4, one or more PDCCH are received. For each pair of carriers (Dn1, Dn2) for which a PDCCH with matching CRC was received on at least one of them (with at most one codeword), the ACK/NACK with PUCCH resource CCE(n1)+N_PUCCH (n1) is used where CCE(n1) is the starting CCE of the received PDCCH on carrier Dn1, and N_PUCCH(n1) is an offset determined by either providing N_PUCCH(n1) higher layers for each DL carrier, or defining N_PUCCH(n1) as the sum of N_PUCCH(1)+NCCE(1)+NCCE(2)+ . . . +NCCE (n), where N_PUCCH(1) is provided by higher layers and NCCE(n) is the total number of CCEs on carrier Dn.

With this method, the WTRU 700 may use format 1b with the 2-value ACK/DTX/NACK code point corresponding to the ACK/DTX/NACKs feedback to be sent for carriers Dn1 and Dn2.

The second method may be used in combination with the third method. The second method may be used whenever more than one codeword need to be sent from any carrier of a pair of carriers which data is received from.

The WTRU 700 may send periodic CQI/PMI/RI reporting for each of the activated DL carriers (Carriers 1D, 2D, . . . , yD) using the PUCCH of the UL primary carrier. Furthermore, the consolidated periodic CQI/PMI/RI reporting may be sent on the PUCCH, even if data is sent by the WTRU 700 on the UL-SCH in the same subframe and same carrier in contrast to LTE. Higher layers will configure both the reporting interval of each activated DL carrier and the PUCCH format to be used. CQI information sent periodically over determined PUCCH resource of the UL primary carrier may be representative of a single carrier at a time. There is no need to associate carrier ID information with CQI reporting. Periodic CQI/PMI/RI reporting on PUCCH depends on the DRX state of the corresponding DL carrier that is being reported on. Therefore, the consolidated report may not always report on all DL carriers and the single carrier at a time report may be skipped when one or more DL carriers are in a DRX state.

In the case that a periodic CQI/PMI/RI must be reported at a given subframe and a PUSCH allocation on the same carrier or on a different carrier is available, the periodic CQI/PMI/RI may be sent over the PUSCH resource.

When an SR is triggered it may be transmitted by either a PUCCH or a PRACH. When the SR is triggered on the PUCCH or the PRACH, the SR is sent on the UL primary carrier.

Alternatively, a PUCCH resource of a UL non-primary carrier may be reserved by higher layers for the WTRU 700 and used by the WTRU 700 to trigger certain procedures, such as a primary carrier change in the UL or the DL. Additionally, when a buffer status report (BSR) and/or power headroom report (PHR) reporting criteria is triggered, the MAC protocol data unit (PDU) may be sent on the UL primary carrier.

In the initial setup of a UL carrier through RRC message, it should be allowed not to assigned dedicated PUCCH resource for an SR for a UL non-primary carrier and logically assigned dedicated PUCCH resource for SR for the UL primary carrier.

In the context of multiple UL carriers where one UL carrier in particular (i.e., the UL primary carrier) is used to carry HARQ feedback and CQI/PMI/RI feedback for multiple DL carriers, the activity on the other UL carriers may be mostly limited to UL traffic (limited control data). Therefore, it may be valuable to implicitly stop sounding reference signal (SRS) transmission on the non-primary carrier without explicit MAC CE or RRC signaling. For example, the WTRU 700 may stop SRS transmission on a UL CC upon expiration of a UL inactivity timer that is re-started every time there is a PUSCH transmission on this UL CC.

The WTRU 700 may resume SRS transmission on a given UL carrier when the UL data buffer associated with this specific UL carrier reaches a certain threshold. Furthermore, the network receiving the SRS again could proactively send UL grants. This would provide another mechanism for the WTRU 700 to request a UL grant. This may also be applied to primary carrier in which the activity may also be subject to UL traffic and implicitly stop SRS transmission on the primary carrier without explicit MAC CE or RRC signaling. This is because that even though there are HARQ feedback and CQI/PMI/RI feedback on the primary carrier, they are limited in the PUCCH resources and demodulation reference signal (DM RS) for PUCCH is used for the channel quality estimate instead of using SRS. Therefore, the SRS transmission may be turned off if the UL data buffer associated with the primary carrier is below a certain threshold and the SRS transmission may be resumed if the UL data buffer associated with the primary carrier is above certain threshold.

Assuming the WTRU 700 is configured with multiple DL carriers (1D, 2D, . . . yD), the relative reference signal received power (RSRP) and reference signal received quality (RSRQ) level of each active DL carriers may be different, thus the WTRU 700 may be configured with new measurement reporting event that compares the relative signal quality of each carrier. For example, one measurement reporting event could be triggered if the RSRQ of the DL primary carrier is below a certain threshold and one of the DL non-primary carrier part of a candidate set exhibits a RSRQ larger than the current RSRQ of the primary by a certain amount (e.g., in dBs).

The candidate set may be a different set than the current set of active DL carriers for the WTRU 700. This candidate set could be signaled by the network which takes into account other factors such as the control region load in the cell for each carrier.

Referring again to FIG. 7, the WTRU 700 is configured to reselect an uplink (UL) primary carrier. The processor 720 may be configured to use a particular UL carrier as a first UL primary carrier. The receiver 710 may be configured to receive and decode a first RRC message and receive a UL grant. The transmitter 715 may be configured to transmit an SR on a second UL primary carrier, and transmit a second RRC message acknowledging receipt of the first RRC message on a PUSCH allocated by the UL grant.

The transmitter 715 may be configured to transmit an HARQ ACK or NACK over the second UL primary carrier to provide feedback pertaining to a particular DL-SCH.

The transmitter 715 may be configured to transmit a CQI over the second UL primary carrier to provide feedback pertaining to a particular DL-SCH.

Feedback pertaining to a particular DL-SCH may be transmitted over a PUCCH of the second UL primary carrier.

Multiple HARQ feedbacks resulting from a received PDSCH may be consolidated and transmitted on PUCCH resources of the second UL primary carrier.

The first RRC message may indicate that a one-direction intra-cell handover should be initiated.

The first RRC message may include a field that identifies the second UL primary carrier.

The first RRC message may include a field indicating assigned PUCCH resources.

The first RRC message may include an RRC field indicating that the first RRC message constitutes a one-direction UL handover.

The SR may be sent on the second UL primary carrier using new resources indicated in the first RRC message.

The processor 720 in the WTRU 700 may be configured to use a particular UL carrier as a UL primary carrier, and initiate a RACH procedure on a second UL primary carrier. The receiver 710 may be configured to receive and decode a first RRC message, receive a random access response message and receive a UL grant. The transmitter 715 may be configured to transmit a preamble, and transmit a second RRC message acknowledging receipt of the first RRC message on a PUSCH allocated by the UL grant.

The first RRC message may include a field indicating RACH dedicated resources.

The RACH message may include timing alignment or timing advance information.

The receiver 710 may be configured to receive a MAC CE primary change command. The processor 720 may be configured to use a particular UL carrier as a first UL primary carrier. The PHY layer 730 may be configured to send a first ACK via the first UL primary carrier at a first subframe, and send a second ACK via a second UL primary carrier at a second subframe. The MAC layer 725 may be configured to process the MAC CE primary change command, inform the PHY layer about the location of the second UL primary carrier, and process the same MAC CE primary change command as was previously processed. The PHY layer 730 and the MAC layer 725 may reside in the processor.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method, implemented by a wireless transmit/receive unit (WTRU), for multi-carrier operations, the method comprising:
   transmitting feedback information pertaining to a downlink-synchronization channel (DL-SCH) on a physical uplink shared channel (PUSCH) of one of multiple uplink component carriers (UL CCs) on a condition that PUSCH transmission is occurring on at least one of the multiple UL CCs on a current subframe; and
   transmitting the feedback information on a physical uplink control channel (PUCCH) of a predetermined one of the multiple UL CCs on a condition that no PUSCH transmission by the WTRU is occurring on any of the multiple UL CCs on the current subframe.

2. The method of claim 1, wherein the feedback information is hybrid automatic reply request (HARQ) acknowledgement (ACK).

3. The method of claim 1, wherein the feedback information is transmitted on the predetermined one of the multiple UL CCs selected based on rank on a condition that PUSCH transmissions are occurring on at least two of the multiple UL CCs.

4. The method of claim 3, wherein rank information for the rank is signaled by higher layers.

5. The method of claim 1, wherein an UL CC used to transmit the feedback information on the PUCCH is signaled by higher layers.

6. The method of claim 1, wherein a serving cell used to transmit the feedback information on the PUCCH is signaled by higher layers.

7. A method, implemented by a wireless transmit/receive unit (WTRU), for multi-carrier operations, the method comprising:
   transmitting feedback information pertaining to a downlink-synchronization channel (DL-SCH) on a physical uplink shared channel (PUSCH) of one of multiple uplink component carriers (UL CCs) on a condition that PUSCH transmission is occurring on at least one of the multiple UL CCs on a current subframe; and
   transmitting the feedback information on a physical uplink control channel (PUCCH) of a predetermined one of multiple UL CCs on a condition that no PUSCH transmission by the WTRU is occurring on any of the multiple UL CCs on the current subframe.

8. The method of claim 7, wherein the feedback information is hybrid automatic reply request (HARQ) acknowledgement (ACK).

9. The method of claim 7, wherein the feedback information is transmitted on the predetermined one of the multiple UL CCs selected based on a rank on a condition that PUSCH transmissions are occurring on at least two of the multiple UL CCs.

10. The method of claim 9, wherein rank information for the rank is signaled by higher layers.

11. The method of claim 7, wherein an UL CC used to transmit the feedback information on the PUCCH is signaled by higher layers.

12. The method of claim 7, wherein a serving cell used to transmit the feedback information on the PUCCH Is signaled by higher layers.

13. A wireless transmit/receive unit (WTRU) configured for multi-carrier operations, comprising:
   a transmitter;
   a receiver;
   a memory; and
   a processor,
      wherein the processor and the memory are configured to cause the transmitter to:
      transmit feedback information pertaining to a downlink-synchronization channel (DL-SCH) on a physical uplink shared channel (PUSCH) of one of multiple uplink component carriers (UL CCs) on a condition that PUSCH transmission is occurring on at least one of the multiple UL CCs on a current subframe; and
      transmit the feedback information on a physical uplink control channel (PUCCH) of a predetermined one of multiple UL CCs on a condition that no PUSCH transmission by the WTRU is occurring on any of the multiple UL CCs on the current subframe.

14. The WTRU of claim 13, wherein the feedback information Is hybrid automatic reply request (HARQ) acknowledgement (ACK).

15. The WTRU of claim 13, wherein the feedback information is transmitted on the predetermined one of the multiple UL CCs selected based on a rank on a condition that PUSCH transmissions are occurring on at least two of the multiple UL CCs.

16. The WTRU of claim 15, wherein rank information for the rank is signaled by higher layers.

17. The WTRU of claim 15, wherein an UL CC used to transmit the feedback information on the PUCCH is signaled by higher layers.

18. The WTRU of claim 15, wherein a serving cell used to transmit the feedback information on the PUCCH is signaled by higher layers.

19. A base station configured for multi-carrier operations, comprising:
   a transmitter;
   a receiver;
   a memory; and
   a processor,
      wherein the processor and the memory are configured to cause the receiver to:
      receive feedback information pertaining to a downlink-synchronization channel (DL-SCH) on a physical uplink shared channel (PUSCH) of one of multiple uplink component carriers (UL CCs) on a condition that PUSCH transmissions by a wireless transmit/receive unit (WTRU) are occurring on any of the multiple UL CCs on a current subframe; and
      receive the feedback information on a physical uplink control channel (PUCCH) of a predetermined one of multiple UL CCs on a condition that no PUSCH transmission by the WTRU is occurring on any of the multiple UL CCs on the current subframe.

20. The base station of claim 19, wherein the feedback information is hybrid automatic reply request (HARQ) acknowledgement (ACK).

21. The base station of claim 20, wherein the feedback information is transmitted on the predetermined one of the multiple UL CCs selected based on a rank on a condition that PUSCH transmissions are occurring on at least two of the multiple UL CCs.

22. The base station of claim 21, wherein rank information for the rank is signaled by higher layers.

\* \* \* \* \*